(12) United States Patent
Liu et al.

(10) Patent No.: US 10,459,150 B2
(45) Date of Patent: Oct. 29, 2019

(54) LIGHT GUIDE PLATE, BACKLIGHT MODULE AND DISPLAY DEVICE

(71) Applicants: BOE TECHNOLOGY GROUP CO., LTD., Beijing (CN); BOE OPTICAL SCIENCE AND TECHNOLOGY CO., LTD., Jiangsu (CN)

(72) Inventors: Xianglian Liu, Beijing (CN); Jialuo Chen, Beijing (CN)

(73) Assignees: BOE TECHNOLOGY GROUP CO., LTD., Beijing (CN); BOE OPTICAL SCIENCE AND TECHNOLOGY CO., LTD., Suzhou, Jiangsu (CN)

( * ) Notice: Subject to any disclaimer, the term of this patent is extended or adjusted under 35 U.S.C. 154(b) by 0 days.

(21) Appl. No.: 15/578,182

(22) PCT Filed: Jul. 12, 2017

(86) PCT No.: PCT/CN2017/092618
§ 371 (c)(1),
(2) Date: Nov. 29, 2017

(87) PCT Pub. No.: WO2018/032914
PCT Pub. Date: Feb. 22, 2018

(65) Prior Publication Data
US 2018/0292596 A1    Oct. 11, 2018

(30) Foreign Application Priority Data
Aug. 17, 2016 (CN) .......................... 2016 1 0682264

(51) Int. Cl.
*F21V 7/04*    (2006.01)
*F21V 8/00*    (2006.01)

(52) U.S. Cl.
CPC ......... *G02B 6/0046* (2013.01); *G02B 6/0045* (2013.01); *G02B 6/0065* (2013.01); *G02B 6/0061* (2013.01)

(58) Field of Classification Search
CPC .. G02B 6/0046; G02B 6/0061; G02B 6/0038; G02B 6/0045
(Continued)

(56) References Cited

U.S. PATENT DOCUMENTS 8,632,238 B2 * 1/2014 Kurata ................. G02B 6/0028
362/615
2013/0170248 A1    7/2013 Lee et al.
(Continued)

FOREIGN PATENT DOCUMENTS

CN     201078650 Y    6/2008
CN     103221880 A    7/2013
(Continued)

OTHER PUBLICATIONS

Office Action received for Chinese Patent Application No. 201610682264.9, dated May 2, 2018, 12 pages (6 pages of English Translation and 6 pages of Office Action).
(Continued)

*Primary Examiner* — Matthew J. Peerce
(74) *Attorney, Agent, or Firm* — Womble Bond Dickinson (US) LLP

(57) ABSTRACT

The present disclosure relates to a light guide plate, comprising a light guide plate body. In such a light guide plate, the light guide plate body comprises: a first surface serving as a light exit surface, a second surface opposite to the first surface, as well as a first side surface adjacent to the first surface and serving as a light incident surface. Furthermore, the first surface further comprises a light source bright region and a light source dark region, wherein the light
(Continued)

source dark region is located on a side of the light source bright region remote from the first side surface. Besides, an optical structure for changing an angle of light emitted out from the first surface is further provided in the light source dark region. The present disclosure further relates to a backlight module and a display device comprising such a light guide plate.

17 Claims, 2 Drawing Sheets

(58) Field of Classification Search
USPC .......................................................... 362/615
See application file for complete search history.

(56) References Cited

U.S. PATENT DOCUMENTS

2014/0104876 A1  4/2014  Yang et al.
2015/0323836 A1  11/2015  Liu et al.

FOREIGN PATENT DOCUMENTS

| | | |
|---|---|---|
| CN | 103837923 A | 6/2014 |
| CN | 103939790 A | 7/2014 |
| CN | 103994399 A | 8/2014 |
| CN | 104676296 A | 6/2015 |
| CN | 204494198 U | 7/2015 |
| CN | 106094096 A | 11/2016 |
| JP | 2006012509 | 1/2006 |

OTHER PUBLICATIONS

International Search Report received for PCT Patent Application No. PCT/CN2017/092618, dated Sep. 27, 2017, 8 pages (3 pages of English Translation and 5 pages of Original Document).
Office Action received for Chinese Patent Application No. 201610682264.9, dated Nov. 16, 2018, 12 pages (6 pages of English Translation and 6 pages of Office Action).
"Fourth office action," CN Application No. 201610682264.9 (dated Jun. 5, 2019).

* cited by examiner

LIGHT GUIDE PLATE, BACKLIGHT MODULE AND DISPLAY DEVICE

The present application is the U.S. national phase entry of PCT/CN2017/092618, with an international filling date of Jul. 12, 2017, which claims the priority of the Chinese patent application No. 201610682264.9 filed on Aug. 17, 2016, disclosures of both are incorporated herein by reference.

TECHNICAL FIELD

The present disclosure relates to the technical field of liquid crystal products, and specifically discloses a light guide plate, a backlight module and a display device.

BACKGROUND ART

Light output uniformity is one of the most important parameters for measuring qualities of a backlight source. Usually, a central point of the backlight source has the highest luminance according to requirements of optical qualities. For an edge-type backlight source, the center having the highest luminance will necessarily cause the luminance on a side remote from the light source to be reduced, thereby forming a dark region in a central part on the side remote from the light source. Even if mesh-point structures are distributed most densely in such a dark region, the optical luminance still cannot be improved.

SUMMARY

In order to solve the above technical problem, the present disclosure provides a light guide plate, a backlight module and a display device.

According to an aspect, a light guide plate is provided, comprising a light guide plate body. Specifically, in the light guide plate, the light guide plate body comprises: a first surface serving as a light exit surface, a second surface opposite to the first surface, as well as a first side surface adjacent to the first surface and serving as a light incident surface. Furthermore, the first surface further comprises a light source bright region and a light source dark region, wherein the light source dark region is located on a side of the light source bright region remote from the first side surface. Besides, an optical structure for changing an angle of light emitted out from the first surface is further provided in the light source dark region.

Furthermore, in a specific embodiment, the light guide plate body further comprises a second side surface opposite to the first side surface.

Furthermore, in a specific embodiment, the optical structure comprises a curved structure recessed into the light guide plate body.

Furthermore, in a specific embodiment, a recess depth of the curved structure gradually increases in a first direction from the first side surface to the second side surface. As will be understood by one skilled in the art, the "recess depth" herein refers to a depth of the curved structure recessed into the light guide plate body.

Furthermore, in a specific embodiment, the light source bright region is located on a central position of the first surface. Besides, in the first direction from the first side surface to the second side surface, the light source bright region and the light guide plate body both have a first width, wherein the first width of the light source bright region is $1/5$~$4/5$ of that of the light guide plate body. Likewise, in a second direction perpendicular to the first direction, the light source bright region and the light guide plate body both have a second width, wherein the second width of the light source bright region is $1/5$~$4/5$ of that of the light guide plate body.

Furthermore, in a specific embodiment, in the first direction from the first side surface to the second side surface, the curved structure and the first surface both have an axis of symmetry and the two axes of symmetry coincide.

Furthermore, in a specific embodiment, mesh-point structures for changing an angle of light emitted out from the first surface are further provided on the second surface.

Furthermore, in a specific embodiment, in the first direction from the first side surface to the second side surface, a distribution density of the mesh-point structures gradually increases.

Furthermore, in a specific embodiment, the light guide plate body is formed integrally by injection molding.

Furthermore, in a specific embodiment, the light guide plate body is made of polycarbonate or polymethylmethacrylate.

According to another aspect of the present disclosure, a backlight module is further provided, and such a backlight module comprises the light guide plate described in any of the above embodiments.

According to yet another aspect of the present disclosure, a display device is further provided, and such a display device comprises the above backlight module.

DETAILED DESCRIPTION OF THE EMBODIMENTS

Features and principles of the present disclosure will be explained in detail with reference to the drawings. It should be noted that the listed embodiments are only used for interpreting the present disclosure, instead of limiting the protection scope of the present disclosure.

Figure 1:
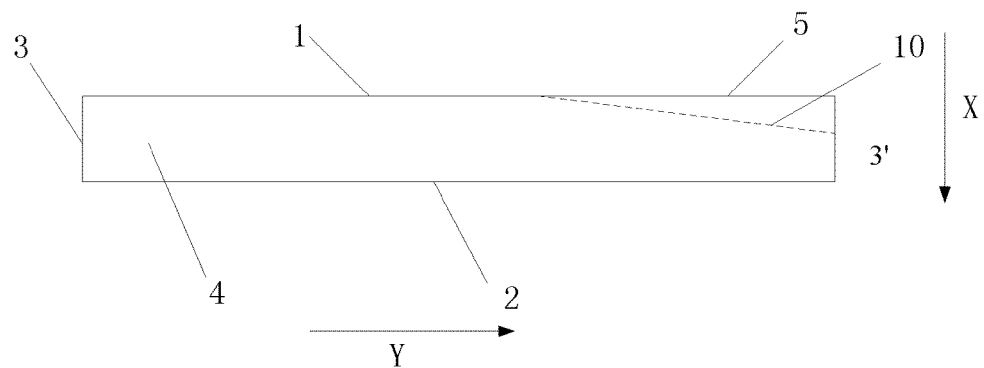
FIG. 1 illustrates a front view for a light guide plate according to an embodiment of the present disclosure.
Figure 2:
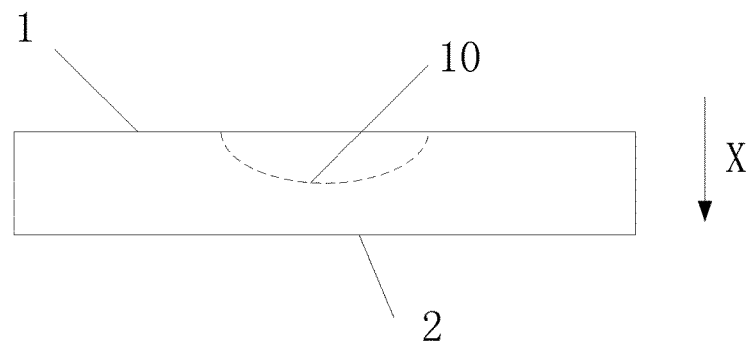
FIG. 2 illustrates a side view for a light guide plate according to an embodiment of the present disclosure.
Figure 3:
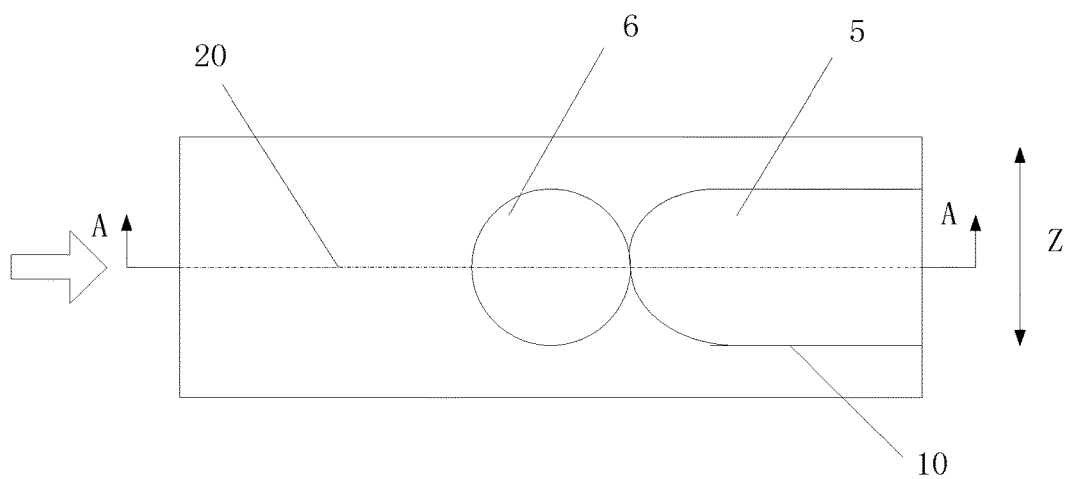
FIG. 3 illustrates a top view for a light guide plate according to an embodiment of the present disclosure.
Figure 4:
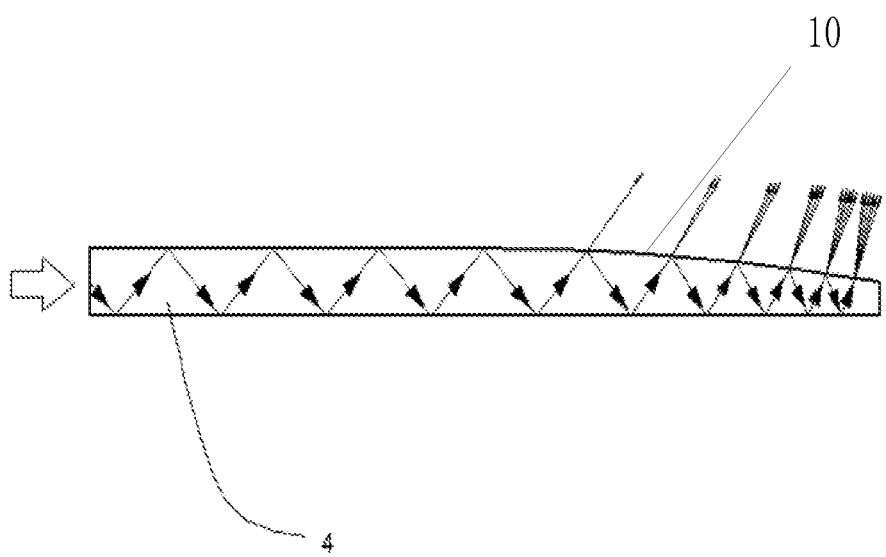
FIG. 4 illustrates a schematic view showing the principle of optical paths in a light guide plate according to an embodiment of the present disclosure.

As shown in FIGS. 1-4, an embodiment of the present disclosure provides a light guide plate. Specifically, the light guide plate comprises a light guide plate body. Such a light guide plate body can comprises: a first surface 1 serving as a light exit surface, a second surface 2 arranged opposite to the first surface 1, a first side surface 3 adjacent to the first surface 1 and serving as a light incident surface, as well as a second side surface (i.e., a right side surface 4 as shown in the drawing) opposite to the first side surface. Besides, the first surface 1 further comprises a light source bright region 6 and a light source dark region 5, wherein the light source dark region 5 is located on a side of the light source bright region 6 remote from the first side surface 3. That is, the light source dark region 5 is located on the right of the light source bright region 6 in the drawing. Furthermore, an optical structure for changing an angle of light emitted out from the first surface 1 is further provided in the light source dark region 5, as shown in FIGS. 2-4.

According to an embodiment of the present disclosure, the arrangement of the optical structure changes the angle of light emitted out from the first surface 1, thereby disrupting the total reflection propagation of light inside the light guide plate. In this way, more light is allowed to be emitted out from the first surface 1. This improves the light utilization, and avoids problems such as dark region in an edge-type backlight source.

According to a specific embodiment, the optical structure can be various specific structures, as long as it can change the angle of light emitted out from the light source dark region 5 on the first surface 1 so as to improve the light utilization. In the current embodiment, the optical structure is a curved structure 10 recessed into the light guide plate body.

As shown in FIG. 1, the light source dark region 5 on the first surface 1 is recessed in a direction X perpendicular to the first surface 1, thereby forming a curved structure 10. As compared with a planar structure in other regions of the light guide plate body, the curved structure 10 recessed into the light guide plate body can change the angle of light emitted out from the first surface 1. In this way, the angle of light emitted out from the light source dark region 5 on the first surface 1 will be greater than or smaller than the critical angle for total reflection. This helps to increase an amount of light emitted out from the light source dark region 5 and improves the light utilization. By doing this, the brightness obtained in the light source dark region 5 of the light guide plate is increased. Thus, problems such as dark region generated in an edge-type backlight source due to being remote from the light source are solved. Besides, the curved structure 10 recessed into the light guide plate body can further function to converge light, which further improves the brightness of the light source dark region 5.

According to a specific embodiment, the curved structure 10 can be fabricated separately after the light guide plate body has been fabricated. Of course, alternatively, the curved surface 10 can also be integrated with the light guide plate body by injection molding. In order to save processing, in the current embodiment, the light guide plate body is formed integrally by injection molding. In this case, the curved structure can be integrated with the light guide plate body by injection molding, as long as an outer convex surface for the curved structure is arranged on an injection mold for forming the light guide plate body. In this case, the outer convex surface corresponds to the light source dark region 5 on the first surface 1 in position.

In the current embodiment, a recess depth of the curved structure 10 gradually increases in a first direction from the first side surface 3 to the second side surface 3' (i.e., the direction Y as shown in FIG. 1).

FIG. 2 is a side view for the light guide plate in FIG. 1. In the drawing, the depth of the curved surface 10 recessed into the light guide plate body (i.e., the depth of the curved surface 10 in the direction X) is preferably half the thickness of the light guide plate body, which is not limited here.

FIG. 4 schematically shows the propagation path of light in the light guide plate according to an embodiment of the present disclosure, wherein thick arrows indicate a light incident direction, and thin arrows indicate light propagating inside the light guide plate body and emitted out from the curved structure 10. Besides, FIG. 4 further illustrates a section view for the light guide plate of FIG. 3 along A-A. As can be seen, more and more light is emitted out from the light source dark region 5 as the depth of the curved structure 10 increases.

Typically, in an edge-type backlight source, the light source is arranged on the first side surface 3 of the light guide plate body, and in the first direction from the first side surface 3 to the second side surface 3', the remoter the light guide plate is from the first side surface 3, i.e., the remoter the light guide plate is from the light source, the lower optical luminance it has. In this regard, in the current embodiment, the recess depth of the curved structure 10 is designed to gradually increase in the first direction from the first side surface 3 to the second side surface 3'. In other words, in the first direction, the remoter the curved structure 10 is from the light source, the greater curvature it has. This ensures the optical uniformity of the light exit surface of the light guide plate.

In the current embodiment, as an example, the light source bright region 6 is located in a central part of the first surface 1 of the light guide plate body. Furthermore, in the first direction Y from the first side surface 3 to the second side surface 3', a first width of the light source bright region 6 is ⅕~⅘ of that of the light guide plate body. Besides, similarly, in a second direction perpendicular to the first direction, a second width of the light source bright region 6 is ⅕~⅘ of that of the light guide plate body.

According to a specific embodiment, in the first direction Y from the first side surface 3 to the second side surface 3', the curved structure 10 and the first surface 1 have axes 20 that coincide.

In this case, as shown in FIG. 3, the curved structure 10 is a symmetrical structure with the second axis 20 being an axis of symmetry. In this way, portions of the curved structure 10 on respective sides of the second axis 20 will have the same light output efficiency. This ensures the uniformity of light emitted out from the light source dark region 5. It should be noted herein that the incident direction of light is indicated by thick arrows in the drawing.

Although the width of the curved structure 10 is shown to be constant in FIG. 3, it should be noted that, in actual applications, the width of the curved structure 10 can vary with the width of the light source dark region 5. As an example, the width of the curved structure 10 can widen gradually in the direction Z, or vary irregularly, which will not be limited here.

It should be emphasized that, the example in this embodiment does not represent any limitations to the specific positions of the light source bright region 6 and the light source dark region 5, and their specific positions can be selected upon actual needs.

According to a specific embodiment, the surface of the curved structure 10 can be either a smooth surface or a rough surface. When the surface of the curved structure 10 is a smooth surface, the display region corresponding to the curved structure 10 will achieve a better display effect. In contrast, when the surface of the curved structure 10 is a rough surface, the display region corresponding to the curved structure 10 will have a higher brightness, which can be set upon actual needs.

According to a further specific embodiment, mesh-point structures for changing an angle of light emitted out from the first surface 1 is further provided on the second surface.

Such mesh-point structures function to scatter light so as to disrupt the total reflection of light inside the light guide plate. As a result, light is emitted out from the light exit surface as much as possible, and the light utilization is improved.

Furthermore, in the first direction Y from the first side surface 3 to the second side surface 3', a distribution density of the mesh-point structures gradually increases.

The remoter the corresponding light exit surface of the light guide plate is from the light source, the lower luminance it has. In this case, in order to ensure the light output uniformity of the light guide plate, the mesh-point structures can be distributed more and more densely in the first direction.

In a specific embodiment, the light guide plate body can be made of polycarbonate (PC) or polymethylmethacrylate (PMMA).

According to another aspect of the present disclosure, a backlight module is further provided, comprising the light guide plate described in any of the above embodiments.

Such a light guide plate comprises a light guide plate body, and an optical structure for changing an angle of light emitted out from the light exit surface is further provided in the light source dark region on the light exit surface of the light guide plate body. The arrangement of the optical structure changes the angle of light emitted out from the light exit surface, thereby disrupting the total reflection propagation of light inside the light guide plate. In this way, more light can be emitted out from the light exit surface, which improves the light utilization and avoids a dark region in an edge-type backlight source.

According to yet another aspect of the present disclosure, a display device is further provided, comprising the above backlight module.

In an embodiment, the backlight module further comprises the light guide plate described in any of the above embodiments. Such a light guide plate comprises a light guide plate body, and an optical structure for changing an angle of light emitted out from the light exit surface is further provided in the light source dark region on the light exit surface of the light guide plate body. The arrangement of the optical structure changes the angle of light emitted out from the light exit surface, thereby disrupting the total reflection propagation of light inside the light guide plate. In this way, more light can be emitted out from the light exit surface, which improves the light utilization and avoids a dark region in an edge-type backlight source.

What mentioned above are only preferred embodiments of the present disclosure. It should be noted that, for one having ordinary skills in the art, several improvements and modifications can also be made without departing from the principle of the present disclosure, and such improvements and modifications should also be deemed as falling within the protection scope of the present disclosure.

The invention claimed is:

1. A light guide plate, comprising a light guide plate body, the light guide plate body comprising:
a first surface serving as a light exit surface;
a second surface opposite to the first surface; and
a first side surface adjacent to the first surface and serving as a light incident surface, wherein
the first surface comprises a first region and a second region, the second region being located on a side of the first region remote from the first side surface, and
an optical structure for changing an angle of light emitted out from the first surface is provided in the second region, the optical structure comprising a curved structure recessed into the light guide plate body, wherein
in a section plane parallel to the first side surface, the optical structure has a U-shape the light guide plate body further comprises a second side surface opposite to the first side surface, and
a recess depth of the curved structure gradually increases in a first direction from the first side surface to the second side surface.

2. The light guide plate according to claim 1, wherein the light guide plate body further comprises a second side surface opposite to the first side surface,
the first region is located in a central position of the first surface,
in a first direction from the first side surface to the second side surface, a first width of the first region is about ⅕~⅘ of that of the light guide plate body, and
in a second direction perpendicular to the first direction, a second width of the first region is about ⅕~⅘ of that of the light guide plate body.

3. The light guide plate according to claim 1, wherein the light guide plate body further comprises a second side surface opposite to the first side surface, and
in a first direction from the first side surface to the second side surface, the curved structure and the first surface share a common axis of symmetry.

4. The light guide plate according to claim 1, wherein mesh-point structures for changing an angle of light emitted out from the first surface are provided on the second surface.

5. The light guide plate according to claim 4, wherein the light guide plate body further comprises a second side surface opposite to the first side surface, and
in the first direction from the first side surface to the second side surface, a distribution density of the mesh-point structures gradually increases.

6. The light guide plate according to claim 1, wherein the light guide plate body is formed integrally by injection molding.

7. The light guide plate according to claim 1, wherein the light guide plate body is made of polycarbonate or polymethylmethacrylate.

8. A backlight module comprising the light guide plate according to claim 1.

9. A display device comprising the backlight module according to claim 8.

10. The backlight module according to claim 8, wherein the optical structure comprises a curved structure recessed into the light guide plate body.

11. The backlight module according to claim 10, wherein the light guide plate body further comprises a second side surface opposite to the first side surface, and
a recess depth of the curved structure gradually increases in a first direction from the first side surface to the second side surface.

12. The backlight module according to claim 10, wherein the light guide plate body further comprises a second side surface opposite to the first side surface,
the first region is located in a central position of the first surface,
in a first direction from the first side surface to the second side surface, a first width of the first region is about ⅕~⅘ of that of the light guide plate body, and
in a second direction perpendicular to the first direction, a second width of the first region is about ⅕~⅘ of that of the light guide plate body.

13. The backlight module according to claim 10, wherein the light guide plate body further comprises a second side surface opposite to the first side surface, and
in a first direction from the first side surface to the second side surface, the curved structure and the first surface share a common axis of symmetry.

14. The backlight module according to claim 8, wherein mesh-point structures for changing an angle of light emitted out from the first surface are provided on the second surface.

15. The backlight module according to claim 14, wherein the light guide plate body further comprises a second side surface opposite to the first side surface, and in the first direction from the first side surface to the second side surface, a distribution density of the mesh-point structures gradually increases.

16. The backlight module according to claim 8, wherein the light guide plate body is formed integrally by injection molding.

17. The backlight module according to claim 8, wherein the light guide plate body is made of polycarbonate or polymethylmethacrylate.

* * * * *